Patented June 28, 1949

2,474,649

UNITED STATES PATENT OFFICE 2,474,649

TREATMENT OF VEGETABLE TISSUE

Clarence Birdseye, Gloucester, Mass., assignor to Dehydration, Inc., Gloucester, Mass., a corporation of Massachusetts No Drawing. Application June 21, 1944, Serial No. 541,459

10 Claims. (Cl. 99—221)

This invention has for its primary objective the production of blanched quick-frozen and dehydrated vegetable matter retaining its original nutrient and flavoring elements more fully than is possible when such vegetable matter is blanched in either water or steam in accordance with current commercial practices. More specific objects of the invention are to permit the blanching of fruits without causing them to take on a "cooked" appearance and flavor; to blanch vegetables with substantially no loss of any of their water-soluble elements; to facilitate penetration into vegetable units of edible materials which have been applied to the exterior thereof before blanching to regulate and control loss of weight during blanching; to provide facilities for both blanching and dehydrating continuously in the same apparatus; and in general to produce frozen and dehydrated vegetables and fruits of high quality in an efficient manner.

According to present commercial practice, practically all vegetables and some fruits which are to be frozen or dehydrated are first given a treatment with hot water or steam to inactivate their enzyme (particularly catalase and peroxidase) content. This treatment has for many years been known as "blanching" and usually consists in raising the temperature of all parts of the moist material to at least 185° F. and maintaining that temperature in the product for at least five seconds. Many types of commercial blanching apparatus are available, and all of them use either water at or near the boiling point or steam at atmospheric or greater pressures. Blanching is so well understood and so universally applied in the processing of vegetables for freezing and dehydrating that details of the procedure need not be described herein. However, there is given below a table of standard blanching times with both hot water and steam as a blanching medium for a number of common vegetables, as recommended on pages 13 and 14 of the 1940 issue of the "Refrigerating Data Book":

| Vegetable | Varieties Best Suited | Best Blanching Medium | Optimum Blanching Period, Sec. |
|---|---|---|---|
| Beans, green shell | French horticultural | Boiling water<br>Steam | 60<br>105 |
| Beets | Crosby | Boiling water | 1½ in. diam. 150; Over 2 in. diam. cooked |
| Beet greens | do | do | 2 |
| Carrots, sliced (½ in.) | Nantes | do | 180 |
| Curly mustard | Giant Southern Curled Mustard | Boiling water<br>Steam | 50<br>90 |
| Kale | Tall Curled Scotch Kale | Boiling water | 70 |
| Kohlrabi, diced | Early White Vienna | Boiling water<br>Steam | 60<br>100 |
| New Zealand spinach | | Boiling water<br>Steam | 70<br>120 |
| Swiss chard | Lucullus | Boiling water | 120 |
| Turnips, diced | Purple Top White Globe | Steam<br>Boiling water | 70<br>60 |
| Asparagus | Washington | Steam | Small stalks, 3½<br>Large stalks, 4½ |
| Beans, lima | Henderson | Boiling water | Small beans, 1<br>Medium beans, 1½<br>Large beans, 2 |
| Beans, snap | Kentucky Wonder<br>Blue Lake<br>Wisconsin Refugee | do | 2 |
| Broccoli | Italian Green Sprouting | do | Small pieces, 3<br>Medium pieces, 4½<br>Large pieces, 5 |
| Cauliflower | Snowball | do | Small pieces, 3<br>Medium pieces, 4 |
| Peas | Thomas Laxton<br>Alderman | do | Small peas, ¾<br>Large peas, 1 |
| Spinach | Nobel<br>Savoy | do | 2½ |
| Sweet corn on cob | 8-row Golden Bantam<br>Golden Cross Bantam | Steam | Small ears, 6<br>Medium ears, 8<br>Large ears, 10 |
| Cut | 14-row Golden Bantam<br>Golden Bantam | do | 1½ |

Present commercial methods of blanching are highly objectionable because they subject the product to the leaching action of hot water. This is true whether the product is blanched directly in hot water or by subjecting it to the action of steam at or above atmospheric pressure—for when steam is used, considerable amounts of the steam are condensed onto the relatively cool surfaces of the product units during the blanching process. A further disadvantage of steam blanching is that if the product units are to be evenly blanched, they must be either spread in a very thin, uniform layer or must be thoroughly stirred throughout the blanching process. Stirring during blanching is sometimes highly undesirable; for it inevitably abrades, or even breaks, the units of such delicate vegetables as white and sweet potatoes.

Another objectionable feature of present methods is that facilities for such blanching cannot readily be incorporated as an integral part of a dehydrating apparatus. Still another undesirable characteristic of present blanching practice is that when vegetables and fruits are blanched in hot water or steam, it is necessary to overheat the surface areas of the product units (or of the mass of units, if blanching is done by heating an aggregation of units) in order to heat the interior of the units to the temperature required for enzyme inactivation. For example, corn-on-cob intended for freezing must be heated in live steam for approximately seven to nine minutes (depending on the ear size) in order to bring the center of the cob to the necessary blanching temperature. Cubed white potatoes intended for dehydration must be blanched in hot water or steam till their centers are heated to approximately 190° F., by which time the corners and edges of the cubes are so overheated that they suffer considerable abrasion even when handled gently during subsequent processing. Sliced ripe fruits, for either freezing or dehydrating, become mushy on the surface if blanched in either hot water or steam.

I have discovered that all of the shortcomings of present blanching methods can be overcome by the use of heat generated directly within the vegetable units by high-frequency electric fields. In such fields the temperature of the product is rapidly raised to the desired point throughout its mass. Heat generated in the product in this manner permits effective and accurate blanching without bringing any extraneous water into contact with the surfaces of the product units, and thus avoids completely the leaching action of hot water and steam. Moreover, no stirring of the product during blanching is required; for heating is uniform throughout the mass regardless of the thickness of the mass.

Another advantage of my present invention is that moisture loss from the product during blanching can be accurately controlled merely by regulating the humidity of the gas surrounding the product during the blanching process. For if the product layer is relatively thin and if the surrounding atmosphere is arid, considerable moisture will be evaporated from the product during the blanching process. If, on the contrary, the product layer is quite (several inches) thick and if the atmosphere surrounding the product has a relative humidity of approximately 100 per cent, no moisture can be lost during blanching. Moreover, since the product will at all times during blanching be hotter than the surrounding atmosphere, no moisture can be condensed onto the product from that atmosphere.

By the process of my co-pending application Serial No. 536,422, vegetables intended for dehydration are first drenched with very hot water, next treated with a cooler solution containing edible materials to be added to the vegetables, and then blanched. The edible material penetrates into the vegetable units as their tissues are killed by the heat of blanching. If, however, a steam blanch is used, water condensed from the steam upon the vegetables dilutes and partly washes away the film of edible solution previously applied. This necessarily results in imperfect penetration into the product by the edible materials contained in the solution. My present method of blanching by high-frequency heat generated in the product itself completely eliminates the foregoing difficulties.

Certain fruits (e. g. strawberries) are seriously damaged by excessive heat and can be safely blanched only by prolonged heating at low temperatures; e. g. two to four minutes at 175° F. I prefer to subject such fruits intermittently to the action of high-frequency fields. By this means the entire unit of product can, without danger of overheating, be alternately brought to any desired temperature, allowed to cool slightly, and then again heated to the maximum temperature desired. Moreover, by my method of alternately heating and cooling as described above, even heat-sensitive products may be safely not only blanched, but actually pre-cooked to any desired degree.

Many fruits, for example berries and sliced peaches, are improved in color, flavor, consistency, and aroma if they are blanched while coated with sugar, a neutral sugar-salt film, an acid protecting film or glycerine and acetic acid, or some other edible substance which protects the surface of the fruit from oxidation both during and after blanching and also penetrates into the fruit by osmosis to firm the fruit tissue. Neither steam nor hot water can be used satisfactorily for blanching such coated fruits, for the water removes or dilutes much of the coating. But blanching in a high-frequency electric field, in accordance with my present invention, does not bring extraneous water into contact with the coating on the fruit and does facilitate penetration of the coating into the product.

In certain instances—e. g. ripe plums—it is desirable to blanch the product while submerged in a protective solution, such as sugar syrup, the product being blanched by heat transferred to it from the hot syrup. This type of blanching has been tried experimentally but has not come into commercial use, because the fruit is over-heated at its surface before it is sufficiently heated at its center. By the method of my present invention, however, the fruit and the protective substance in which it is submerged are simultaneously heated throughout by the action of the high-frequency electric field in which they are placed. Thus my invention for the first time makes blanching in a sugar syrup or other liquid commercially practicable.

As pointed out in my copending application Serial No. 536,422, it is often desirable to add an alkaline substance—e. g. sodium bicarbonate—to vegetable tissue for the purpose of tenderizing it. An objection to this method of rendering dehydrated vegetable tissue tender is that only very limited amounts of the alkaline substance can be used without adversely affecting both the flavor and the ascorbic acid content of the tissue. I have found, however, that very great tendering and other characteristics can be obtained if vegetables are first blanched to inactivate their natural enzyme content, and then—either before, during or after dehydration—treated with and caused to absorb a proteolytic enzyme, such as pepsin or papain, or another suitable active enzyme. I prefer to accomplish this by blanching the vegetable tissue in a high-frequency electric field to in activate enzymes found in the living tissue, removing approximately 60 per cent of the moisture from the blanched tissue, causing the partially dehydrated tissue to absorb an aqueous solution of the proteolytic enzyme, and then further dehydrating the vegetable.

The process of my present invention can be applied as a preliminary treatment for vegetable tissue which is to be either frozen or dehydrated. When the product is to be dehydrated, I prefer to use an apparatus of the type disclosed in my co-pending application Serial No. 456,903, filed Sept. 1, 1942, now Patent No. 2,429,876, dated April 29, 1947. In that case I use dielectric material for the top belt of the apparatus and preferably pass the product on that belt repeatedly through high-frequency fields before it is subjected to the hot gas, radiant energy, and conducted heat which characterize the said apparatus. Depending upon the type of installation desired, the blanching may take place on the top belt either before or immediately after the product enters the uppermost tunnel in the apparatus. In certain instances where the product pieces are relatively resistant to breakage or abrasion even after being blanched (e. g. carrots), I may positively stir the product mass while it is passing from one high-frequency field to the next thus accelerating the evaporation of moisture from the product and the consequent cooling of the product units. When vegetable tissue is to be frozen, I have found that it is sometimes advantageous to place the tissue in a consumer package and then blanch the tissue in the package by heating both tissue and package in a high-frequency electric field.

EXAMPLES OF PROCESS

*Sliced apples*

Pare and core sound, ripe apples of any variety, cut into eighths, dip in a light sugar syrup (50% by weight), place in a three-inch layer on a belt conveyor of dielectric material, and subject both the belt and the material to an alternating current field of approximately 15 megacycles thus raising the temperature of the sliced apple to approximately 180° F. Then remove the product from the high-frequency field, allow its temperature to drop to approximately 170° F., and again subject it to the high-frequency field until its temperature has risen a second time to approximately 180° F. If further blanching or pre-cooking is required, repeat the alternate heating and cooling until the desired degree of pre-cooking has been attained. After the foregoing treatment has been completed, the product pieces may be either frozen before or after packing, or dehydrated in an apparatus according to the disclosure of my prior Patent No. 2,419,876.

*Dehydrated cabbage*

Core and shred cabbage in the usual manner. Place the shredded product in a 3-inch layer on an endless woven-wire, stainless-steel belt, shower with boiling water for approximately three seconds, drain for ten seconds, shower with a 130° F. aqueous solution containing ¼ of 1 per cent each of sodium bicarbonate and sodium sulphite and 25 per cent glycerine by weight, drain for twenty seconds, transfer to a layer three inches thick on an endless belt of woven asbestos fibers impregnated with a synthetic resin, and pass through a high-frequency field of approximately 15 to 25 megacycles per second until the temperature of the product mass has been raised substantially uniformly to approximately 200° F. Then, without allowing the blanched product to cool substantially, run it onto the uppermost belt of a dehydrating apparatus similar to that disclosed in my prior Patent No. 2,419,876. In the dehydrating apparatus, dry the cabbage to a residual moisture content of approximately 4 per cent. Then remove the dried cabbage from the dehydrator and package in moisture-vapor-proof cellophane or other material equally impervious to the passage of moisture vapor at room temperature.

In dehydrating cabbage and other leafy vegetables, it is desirable to compact the product before blanching it in order to reduce the volume of the product and the thickness of the layer which must be passed between the electrodes creating the high-frequency field. This is important because power cost runs up as the distance between the electrodes increases. Accordingly, in carrying out my process I may proceed by advancing the leafy vegetable in a loose layer upon a conveyor belt and then compact this layer by passing it between rollers on its way to the high-frequency blanching field.

In blanching fruit or other products in a liquid syrup, I have found it advisable to provide for actual electrical contact between the electrodes and the liquid in which the fruit is immersed since by so doing I am able to achieve a faster and more economical blanching operation. This constitutes a further novel step of my process and may be effected by providing the uppermost electrode with drag wires or strips which will enter the liquid solution as the product being treated is passed between the electrodes.

I have referred hereinabove to the treatment of various vegetable units by immersing or spraying them with a solution containing various agents for protecting or improving the product. I contemplate, however, treating fruit or vegetable units by a dry process of dusting with powder; for example, I may mix powdered sugar, sodium sulphite, and sodium bicarbonate in the proper proportions and dust the cut vegetable units with this powdered mixture before subjecting them to the action of a high-frequency electric field. In this way I cause the powdered agents to penetrate into the vegetable tissue after it has been killed in the blanching step, and all this is effected without any leaching or diluting tendency, and, if desired, simultaneously with an initial stage of dehydration.

Having thus disclosed my invention and described in detail several examples of its practice in the treatment of illustrative products, I claim as new and desire to secure by Letters Patent:

1. In the treatment of vegetable material, the step of blanching to inactivate the enzyme content of vegetable tissue without bringing extraneous water into contact with exposed tissue surface and without material loss of solubles from the tissue, which consists in heating the tissue in a high frequency electric field and in an atmosphere of predetermined humidity whereby moisture loss from the material may be controlled during the blanching process.

2. A process according to claim 1, in which the vegetable material is repeatedly heated with intermittent periods of cooling, in a high frequency electric field.

3. A process according to claim 1, in which the vegetable material is first pressed into compact form and then blanched in a high frequency electric field.

4. A process according to claim 1, in which the vegetable material is maintained during the blanching step in an atmosphere of high relative humidity and evaporation of moisture from the vegetable tissue thus retarded.

5. A process according to claim 1, in which the vegetable is blanched in a high frequency electric field, and then packed in a container and frozen.

6. In a process according to claim 1, in which the vegetable tissue is first enclosed in a non-metallic container wherein it is to be marketed, heated in a high frequency electric field while so contained and while free from contact of extraneous moisture, and thereafter subjected in said container to refrigeration to preserve it.

7. A process according to claim 1, in which the vegetable units are first blanched in a high frequency electric field and while free from contact of extraneous moisture and then subjected to dehydration.

8. A process according to claim 1, in which the blanched vegetable material is partially dehydrated, edible substances added and the vegetable material then further dehydrated.

9. A process according to claim 1, in which the vegetable units are first pretreated with an edible substance and then blanched in a high frequency electric field while free from contact with extraneous water.

10. An improved process of treating vegetable material, including the steps of blanching the vegetable material while maintaining its exposed tissue free from contact with extraneous water and without material loss of solubles from the tissue by heating the material in a high frequency electric field and in an atmosphere of predetermined humidity, having first evenly distributed on the surface of the vegetable material an edible substance which is caused to penetrate into the vegetable material during the blanching process.

CLARENCE BIRDSEYE.

REFERENCES CITED

The following references are of record in the file of this patent:

UNITED STATES PATENTS

| Number | Name | Date |
|---|---|---|
| 1,035,777 | Bullock | Aug. 13, 1912 |
| 1,863,222 | Hoermann | June 14, 1932 |
| 1,900,573 | McArthur | Mar. 7, 1933 |
| 1,914,947 | Golden | June 20, 1933 |
| 1,945,867 | Rawls | Feb. 6, 1934 |
| 1,992,515 | Uhlmann | Feb. 26, 1935 |
| 2,091,263 | Ball | Aug. 31, 1937 |
| 2,112,418 | Hart et al. | Mar. 29, 1938 |
| 2,131,431 | Fiske | Sept. 27, 1938 |
| 2,228,783 | Smith | Jan. 14, 1941 |

FOREIGN PATENTS

| Number | Country | Date |
|---|---|---|
| 508,333 | Great Britain | 1939 |

OTHER REFERENCES

"Thermex High Frequency Heating, pub. by the Girdler Corp., Louisville, Ky. 1942, page 9.

"Modern Packaging," Feb. 1944, by V. W. Sherman. Institute of Food Technologists, 1944, published by the Garrord Press, Champaign, Ill., pages 89 and 90.